United States Patent [19]

Chamberlain

[11] Patent Number: 5,206,300
[45] Date of Patent: Apr. 27, 1993

[54] FUNCTIONALIZED ELASTOMERIC POLYMERS

[75] Inventor: Linda R. Chamberlain, Houston, Tex.

[73] Assignee: Shell Oil Company, Houston, Tex.

[21] Appl. No.: 503,412

[22] Filed: Mar. 30, 1990

[51] Int. Cl.$^5$ ............................................. C08F 297/04
[52] U.S. Cl. ............................... 525/314; 525/285; 525/331.9; 525/333.6; 525/378; 525/383
[58] Field of Search ................. 525/314, 331.9, 333.6, 525/378, 383

[56] References Cited

U.S. PATENT DOCUMENTS

| | | | |
|---|---|---|---|
| 3,234,196 | 2/1966 | Leavitt | 260/93.5 |
| 4,086,171 | 4/1978 | Wood et al. | 252/48.2 |
| 4,471,099 | 9/1984 | Trepka | 525/339 |
| 4,588,765 | 5/1986 | Beever | 524/140 |
| 4,657,970 | 4/1987 | Shiraki et al. | 525/57 |
| 4,868,245 | 9/1989 | Pottick et al. | 525/314 |
| 4,970,254 | 11/1990 | Willis et al. | 525/314 |

FOREIGN PATENT DOCUMENTS 189672  8/1986  European Pat. Off. .

Primary Examiner—James J. Seidleck
Assistant Examiner—Vasu S. Jagannathan

[57] ABSTRACT

Selectively hydrogenated block polymers of an alkenyl aromatic compound and a conjugated alkadiene are functionalized by the presence of a plurality of carbamoyl substituents on aromatic rings in the aromatic portion of the polymer. Such carbamoyl-functionalized derivatives are produced by reaction of corresponding carboxylic acid-functionalized polymers by reaction with ammonia followed by application of heat. The carbamoyl-substituted polymers exhibit improved properties and form blends with engineering thermoplastics.

15 Claims, No Drawings

FUNCTIONALIZED ELASTOMERIC POLYMERS

FIELD OF THE INVENTION

This invention relates to certain functionalized elastomeric polymers and to a process of producing such polymers. More particularly, the invention relates to carbamoyl derivatives of selectively hydrogenated block copolymers of alkenyl aromatic compounds and conjugated alkadienes.

BACKGROUND OF THE INVENTION

Elastomeric polymers, both homopolymers and copolymers, are well known in the art and include natural rubbers and a wide variety of synthetic materials. A particularly useful class of synthetic elastomers is the class of thermoplastic elastomers which demonstrates elastomeric properties at ambient temperatures but which is processable by methods more conventionally employed for non-elastomeric thermoplastics at somewhat elevated temperatures. Such thermoplastic elastomers are illustrated by block polymers of an alkenyl aromatic compound and a conjugated alkadiene, e.g., a block polymer of styrene and butadiene. This particular type of block polymer is well known in the art and a number are commercial, being marketed by Shell Chemical Company as KRATON® Thermoplastic Rubber.

It is also well known in the art that certain of the properties of this class of block polymers are improved by the hydrogenation of some or all of the carbon-carbon unsaturation in the polyalkadiene or aliphatic portion and, on some occasions, by hydrogenation of substantially all of the carbon-carbon unsaturation, including that unsaturation in the poly(alkenyl aromatic compound) or aromatic portion. Certain of these hydrogenated or selectively hydrogenated block polymers are also well known and commercial and a number are commercial being marketed as KRATON®G thermoplastic rubber.

The block polymers of alkenyl aromatic compound and conjugated alkadiene, hydrogenated or non-hydrogenated, are useful for a wide variety of applications and demonstrate a wide range of useful properties. It is, however, desirable on occasion to retain the more beneficial properties of the block polymers while improving certain other properties. One method of property improvement involves the compounding of the thermoplastic elastomers by mixing or blending the elastomers with other materials, organic or inorganic, monomeric or polymeric, which are selected to improve particular properties of the resulting composition without being unduly detrimental toward the properties it is desired to retain. A second method of selective property improvement comprises the functionalization of the thermoplastic elastomer, i.e., the introduction of one or more functional or reactive groups into the molecular structure of the elastomer molecules. Illustrative of such functionalization is the carboxylation of the aromatic portion of the block polymer by reaction with an alkali metal compound, particularly a lithium compound, followed by subsequent reaction of the metallated product with carbon dioxide. Similar reactions take place in the aliphatic portion if the thermoplastic rubber retains ethylenic unsaturation in the aliphatic portion. This process is illustrated by the disclosures of U.S. Pat. No. 4,145,490, U.S. Pat. No. 3,976,628 and published European Patent Application 215,501. Carboxylic acid functions are also introduced into the aliphatic portion by the addition of mercaptoalkanoic acids such as thioglycolic acid to the aliphatic unsaturation or by the grafting of maleic acid compounds such as maleic anhydride onto the aliphatic portion. The former reaction is more fully described by Calhoun et al, U.S. Pat. No. 3,052,657, and the latter reaction by the disclosure of, among many others, U.S. Pat. No. 4,292,414. A copending U.S. patent application Ser. No. 349,547, filed May 9, 1989, describes functionalization of a variety of elastomers by incorporation of carboxylic acid ester groups wherein the ester moiety is a benzocyclobutenealkyl group. Copending U.S. patent application Ser. No. 349,545, filed May 9, 1989, describes other carboxylic acid ester derivatives wherein the ester moiety is propargyl, styrylmethyl or 4-(2-oxazolinyl)benzyl. The salts of primary and secondary amines and carboxylated block polymers, as well as corresponding N-alkylcarboxamides, are disclosed in copending U.S. patent applications Ser. No. 157,348, filed Feb. 17, 1988, and Ser. No. 157,353, filed Feb. 17, 1988. These functionalized derivatives of the thermoplastic elastomers are characterized by modified properties such as improved toughness when compared with the non-functionalized block polymer. Nevertheless, it would be of advantage to provide additional functionalized derivatives of the thermoplastic polymers which additionally demonstrate improved properties.

SUMMARY OF THE INVENTION

The present invention provides certain novel functionalized derivatives of the thermoplastic elastomers characterized as selectively hydrogenated block polymers. More particularly, the present invention provides derivatives of selectively hydrogenated block polymer of alkenyl aromatic compounds and conjugated alkadienes, which derivatives containing carbamoyl substituents in the aromatic portion thereof. The invention also relates to a process for the production of such amide-containing block polymers.

DESCRIPTION OF THE INVENTION

The novel functionalized polymers of the invention are selectively hydrogenated, block polymers having carbamoyl moieties as aromatic ring substituents in the aromatic portion of the elastomeric molecule. The carbamoyl-containing functionalized polymers are produced by heating the ammonium salt which results from reaction of ammonia and a carboxylated, selectively hydrogenated derivative of a block polymer of an alkenyl aromatic compound and a conjugated alkadiene.

The base block polymers from which the functionalized polymers are produced are characterized by the presence of at least one block of at least predominantly polymerized alkenyl aromatic compound (A block) and at least one block of at least predominantly polymerized conjugated alkadiene (B block).

The alkenyl aromatic compound which is useful as the precursor of the A block portion is a hydrocarbon compound of up to 18 carbon atoms inclusive and has an alkenyl group of up to 6 carbon atoms attached to an aromatic ring system of up to 2 aromatic rings. Such alkenyl aromatic compounds are illustrated by styrene (vinylbenzene), 2-butenylnaphthalene and 3-isopropenylbiphenyl. The preferred alkenyl aromatic compounds have an alkenyl group of up to three carbon atoms attached to a benzene ring as exemplified by styrene and styrene homologs such as those of the formula

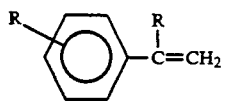

wherein R independently is hydrogen or methyl. These alkenyl benzene compounds include styrene, m-methylstyrene, α-methylstyrene and α,4-dimethylstyrene. The class of styrene and α-methylstyrene is a particularly preferred class of alkenyl aromatic compounds and especially preferred is styrene.

Each A block of the base block polymers is at least predominantly the polymerized alkenyl aromatic compound and is preferably homopolymeric. The A blocks containing a polymerized mixture of more than one alkenyl aromatic compound are also suitable, but are less preferred. Also useful are A blocks wherein the alkenyl aromatic compound is copolymerized with a lesser proportion of the conjugated alkadiene of the B block portion. One type of this latter block is conventionally termed a "tapered" block and such blocks will contain at least about 85% by mole and preferably at least 93% by mole of the alkenyl aromatic compound of block A with any remainder being the conjugated alkadiene of block B. The average molecular weight of an A block is typically from about 1,000 to about 125,000 but A blocks of an average molecular weight from about 5,000 to about 75,000 are preferred.

Each B block of the base block polymer is a block of at least predominantly polymerized conjugated alkadiene. The conjugated alkadienes useful as precursors of a B block have up to 7 carbon atoms such as those conjugated alkadienes of the formula

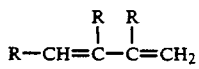

wherein R independently has the previously stated meaning. Illustrative of such conjugated alkadienes are 1,3-butadiene (butadiene), 2-methyl-1,3-butadiene (isoprene), 1,3-pentadiene (piperylene) and 2-methyl-1,3-pentadiene. Preferred alkadienes are butadiene and isoprene, particularly butadiene. The B blocks which contain more than one conjugated alkadiene and tapered blocks with the monomer of block A are satisfactory in the base polymers, but are less preferred. The preferred B blocks are at least about 85% by mole and preferably at least about 93% by mole of conjugated alkadiene with any remainder being the alkenyl aromatic compound of block A. The B blocks which are homopolymeric are particularly preferred.

Within a polymerized conjugated alkadiene block two modes of polymerization are possible and are generally observed. In what is termed 1,4 polymerization, each carbon atom of the four carbon nucleus of the conjugated alkadiene is incorporated within the polymer chain which then includes two carbons joined by an ethylenic linkage. In 1,2 polymerization, the polymerization involves only one carbon-carbon double bond of the conjugated alkadiene. The carbon atoms of that double bond will be incorporated within the polymer chain which then includes pendant vinyl unsaturation. Control of these two types of polymerization is within the skill of the art. Preferred base block polymers are those wherein from about 25% to about 100% of the units of each B block result from 1,2 polymerization, preferably from about 35% to about 55%. The average molecular weight of a B block is suitably from about 10,000 to about 450,000, preferably from about 10,000 to about 150,000.

The base block polymer suitably has an A block content of no more than about 55% by weight and preferably from about 2% by weight to about 55% by weight based on total block polymer. The total average molecular weight of the block polymer will be on the order of from about 11,000 to about 2,500,000 but preferably from about 25,000 to about 300,000. These molecular weights are peak molecular weights as determined by conventional analytical techniques such as gel permeation chromatography or low angle laser light scattering.

The structure of the base block polymer will depend upon the method employed to produce the polymer. In one modification, the block polymer is termed linear and is illustratively produced by sequential polymerization of the blocks. By way of example in the preparation of a three block or triblock polymer, the alkenyl aromatic compound of the A blocks is polymerized through the use of an anionic polymerization initiator which is preferably an alkyllithium compound. The resulting polymeric species containing an organometallic site is used to initiate the polymerization of conjugated alkadiene introduced to form the B block and subsequently additional alkenyl aromatic compound is introduced to form a second A block. Such a three block polymer is characterized as ABA. A two block or diblock polymer produced by sequential polymerization of the alkenyl aromatic compound and the conjugated alkadiene is termed an AB polymer. Substantially complete polymerization of each monomer prior to introducing the monomer of the next block will result in the production of homopolymeric blocks. If, however, prior to the complete polymerization of the monomer of any given block the monomer of the next block is introduced, tapered blocks will result. Similar sequential polymerization techniques are employed to produce block polymers characterized as ABAB, ABABA, ABABABA or polymers of an even higher number of blocks. Production of block polymers having a relatively high number of blocks or relatively high molecular weight is also accomplished by the use of a coupling agent to couple or connect growing polymer chains. Use of a difunctional coupling agent such as a dihaloalkane will result in the production of linear polymers but use of a coupling agent having a functionality of three or more, e.g., polyvinyl aromatic compounds, silicon tetrahalides or alkyl esters of dicarboxylic acids will result in the formation of block polymers termed "star", "radial" or "branched", respectively. The presence of a coupling agent will have little or no effect on the properties of the coupled polymers and the coupling agent is conventionally disregarded in characterizing the polymers in terms of the A block portion and the B block portion.

These block polymers and the production thereof are well known in the art and the characterization and preparation of such polymers are illustrated by U.S. Pat. Nos. 3,251,905; 3,390,207; 3,598,887; 4,219,627; 4,408,357; 4,497,748 and 4,426,495.

The block polymers most useful as precursors of the functionalized block polymers of the invention are linear block polymers of the types:

polystyrene-polybutadiene (SB),
polystyrene-polyisoprene (SI),
polystyrene-polybutadiene-polystyrene (SBS), and
polystyrene-polyisoprene-polystyrene (SIS).

Block polymers of the SBS type are particularly preferred. These block polymers are conventional and a number are commercial being marketed by Shell Chemical Company as KRATON ® Thermoplastic Rubber.

To prepare the selectively hydrogenated block polymers of limited aliphatic unsaturation which are carboxylated in the overall process of the invention the base block polymers are hydrogenated by a process which will hydrogenate no more than 25% and preferably no more than 5% of the aromatic unsaturation present in the base block polymer but which is sufficient to hydrogenate at least 80% and preferably at least 99.9% of the aliphatic unsaturation of the base block polymer. The selectively hydrogenated block polymer will therefore contain substantially all of the aromatic unsaturation of the base block polymer with little or none of the aliphatic unsaturation remaining. Such selective hydrogenation is now conventional and is accomplished by conventional methods such as the processes of U.S. Pat. No. 3,113,986 and U.S. Pat. No. 4,226,952. The selectively hydrogenated block polymer is conventionally identified by the structure of the block copolymer precursor and the "apparent" structure of the aliphatic block. Thus, selective hydrogenation of a SBS polymer will result in a polymer having a mid-block which is apparently polyethylene in the case of a mid-block produced entirely by 1,4 polymerization and an ethylene/butylene copolymer in the case of a mid-block produced with random proportions of both 1,2 and 1,4 polymerization. These selectively hydrogenated block polymers would be indicated by SES and SE/BS or SEBS respectively. A corresponding diblock polymer would be indicated by SE or SEB. The polymer produced by hydrogenation of a SIS block polymer produced with a high degree of 1,4 polymerization would be termed a SEPS or SE/PS polymer because of the similarity of the hydrogenated mid-block to an ethylene/propylene copolymer. The preferred block polymers of limited aliphatic unsaturation are selectively hydrogenated polymers of the SEBS type wherein units of the mid-block are from about 45% to about 65% of the E type with the remainder being of the B type. The selectively hydrogenated block polymers of these types are also well known with a number of the polymers being commercial, being marketed by Shell Chemical as the KRATON ®G Thermoplastic Elastomers.

The selectively hydrogenated block polymers are carboxylated to introduce carboxylic acid functionality into the aromatic portion of the block polymer molecule. The carboxylic acid functionality is introduced by consecutive steps of metallation, carboxylation and acidification. The process of metallation comprises the creation of chemically active sites on the aromatic rings of the aromatic portion of the block polymer by reaction of the polymer and an active metal compound, particularly when the active metal of the active metal compound is an alkali metal. The alkali metal compound is suitably an organometallic compound and organometallic compounds of lithium, sodium, potassium, rubidium or cesium are satisfactory. The alkali metal organometallic compound is preferably an alkali metal alkyl or aryl and compounds such as methyllithium, isopropylsodium, sec-butyllithium and phenylpotassium are satisfactory. The lithium alkyls are preferred, especially when the alkyl is a secondary alkyl, and particularly preferred is sec-butyllithium. The metallation process serves to introduce the alkali metal onto the polymer, particularly onto aromatic rings of the aromatic portion of the selectively hydrogenated block polymer although a minor amount of metallation may occur in the aliphatic portion if the aliphatic portion contains residual unsaturation. This aliphatic metallation is minor and is acceptably disregarded in the determination of the structure and properties of the final polymer molecule. It should also be appreciated that the metallation process will typically introduce a number of alkali metal moieties onto any single polymer molecule, determined in part by the relative proportions of polymer and organometallic compound reactants and by the reaction conditions employed in the metallation process.

The metallation reaction typically takes place at a temperature from about 0° C. to about 100° C. in the liquid phase in the presence of an inert reaction diluent, for example, a saturated aliphatic hydrocarbon such as cyclohexane. The amount of organometallic compound to be employed is suitably from about 5 milliequivalents to about 95 milliequivalents per 100 g of selectively hydrogenated block polymer to be metallated. The metallation reaction, which is often unduly slow unless elevated temperatures are employed, is facilitated by the presence of an amine promoter within the reaction mixture. Tertiary amines are generally satisfactory as metallation promoters although that class of tertiary amines known as bridgehead amines and exemplified by trimethylethylenediamine is preferred. The promoter is employed in quantities which are approximately equimolar with the organometallic compound. This process of metallation is known in the art, being described more fully in Trepka, U.S. Pat. No. 4,145,298.

The carboxylation process which is applied to the metallated, selectively hydrogenated block polymer is also well known in the art. The metallated polymer is contacted with gaseous carbon dioxide by passing the carbon dioxide through a solution of the metallated polymer in an inert reaction diluent which is preferably the diluent in which the metallated polymer is produced. A typical carboxylation reaction temperature is from about 0° C. to about 100° C. and a convenient pressure of carbon dioxide is that pressure required to bubble the carbon dioxide through the solution of the metallated polymer. This process is described more fully in U.S. Pat. No. 4,145,490, U.S. Pat. No. 3,976,628 and published European Patent Application 215,501. The metallated polymer reacts with the carbon dioxide to produce a metal salt, typically an alkali metal salt, of the carboxylated selectively hydrogenated block polymer and thereby introduces carboxylate functionality into the polymer. This metal salt is acidified as by contact with dilute mineral acid such as hydrochloric acid or an organic acid, such as acetic acid, and the resulting carboxylic acid functionalized polymer is recovered by conventional methods such as selective extraction or filtration, following if necessary, precipitation with a non-solvent.

The resulting carboxylic acid-functionalized polymer is the selectively hydrogenated block polymer further characterized by the presence of carboxylic acid moieties as substituents of aromatic rings of the aromatic portion of the block polymer molecule. The number of carboxylic acid moieties per molecule will depend upon the degree of metallation the polymer underwent and is, of course, an average number since the absolute number of carboxylic acid moieties will vary from one molecule to another. Typically, the carboxylic acid-functionalized polymer will have an average of from about 8 to about 20 carboxylic acid moieties per molecule, more often from about 10 to about 15. The carboxylic acid moieties will be randomly distributed through the aromatic portion of the polymer molecule.

The carboxylic acid-functionalized block polymer is converted to the carboxamide-functionalized polymer by reaction with ammonia in liquid phase solution in a polar reaction diluent or a mixture of a polar reaction diluent and inert organic solvent, meaning a solvent that does not react with any of the substances participating in the reaction, followed by the application of heat to convert the ammonium salt groups initially formed to carbamoyl groups. In a typical procedure the carboxylic acid-functionalized block polymer is dissolved in the polar reaction diluent and contacted with anhydrous ammonia. Suitable reaction diluents include ethers such as diethyl ether, tetrahydrofuran, and 2-methoxyethyl ether, as well as ether and inert hydrocarbon mixtures. Suitable inert hydrocarbon reaction diluents include n-pentane, n-hexane, n-heptane, n-octane, and alicyclic hydrocarbons such as cyclohexane and cycloheptane. The ammonia is preferably provided as gaseous ammonia which is passed into the polymer solution at pressures up to about 150 psig, preferably up to about 100 psig. The ammonia is typically added at temperatures from about 10° C. to about 60° C. and is conveniently introduced into the polymer solution as by bubbling at the ambient temperature of the addition. The ammonium salt which initially results from this contacting is isolated, if desired, by known techniques such as solvent removal or precipitation. It is preferred, however, to further react this ammonium salt in situ without isolation to the carbamoyl-functionalized polymer. This conversion is accomplished by heating the ammonium salt intermediate to an elevated temperature and pressure. Typical reaction temperatures are at least about 180° C. and are preferably at least about 210° C. Suitable reaction pressures are from about 200 psi to about 1500 psi with a convenient pressure being that generated when the reaction mixture is heated to reaction temperature in a sealed reaction environment. The carbamoyl-functionalized polymer is then recovered from the product mixture by conventional methods such as selective extraction or precipitation with a nonsolvent such as methanol or isopropanol.

The carbamoyl-functionalized polymers of the invention are the selectively hydrogenated block polymers having, as an average, a plurality of carbamoyl moieties, i.e., —CONH$_2$ groups, as substituents on aromatic ring carbon atoms of the aromatic portion of the polymer molecule. In the event that not all the carboxylic acid groups of the carboxylic acid-functionalized precursor reacted with ammonia, there will be a number of carboxylic acid moieties also present as substituents in the aromatic portion of the polymer molecule. However, under the conditions of the reaction with ammonia a substantial proportion, generally more than about 60% and often more than about 80%, of the carboxylic acid groups will be converted to carbamoyl moieties so that the carbamoyl-functionalized polymer will contain an average of from about 5 to about 16 carboxamide groups per molecule, more often from about 8 to about 15 carboxamide moieties per molecule, randomly found throughout the aromatic portion of the molecule.

The carbamoyl-functionalized, selectively hydrogenated block copolymers of the invention are elastomeric materials of the thermoplastic rubber type and are somewhat basic because of the presence of the carbamoyl groups. As compared with the precursors, the polymers of the invention demonstrate improved solvent resistance and a higher upper service temperature. The polymers form blends with engineering thermoplastics such as polyamides and polyesters to lend improved properties, such as tensile strength and Izod impact strength to the blends. The carbamoyl-functionalized polymers can also be blended with motor oils to act as viscosity index improvers or dispersants.

The invention is further illustrated by the following Illustrative Embodiments which should not be regarded as limiting.

ILLUSTRATIVE EMBODIMENT I

A selectively hydrogenated diblock copolymer of the SEP type was produced by conventional procedures having molecular weight dimensions of 37,000–60,000 and 2.2% by weight of carboxylic acid groups contained in the aromatic portion of the elastomeric molecule. A 5% by weight solution of this elastomer was prepared with tetrahydrofuran as solvent and the solution was heated to about 60° C. while being stirred. While stirring continued, ammonia was bubbled through the solution for approximately 5 hours, during which time the excess ammonia was trapped and recycled. After the 5 hour period the solution was cooled and the excess ammonia was driven off. The resulting polymer was coagulated from isopropanol, washed with water and dried in a vacuum oven at 70° C. The infrared spectrum of this product was consistent with the presence of quaternary ammonium carboxylate groups (C=O stretch at 1550 cm$^{-1}$). The polymer crumb, with the salt functionality, was then heated in a vented oven at 190° C. to produce the corresponding carbamoyl groups. The infrared spectrum of the final product was consistent with the presence of amide functionality (C=O stretch at 1670 cm$^{-1}$), and little or no acid functionality (C=O stretch at 1690 cm$^{-1}$). Proton and carbon nuclear magnetic resonance indicated the presence of carbamoyl groups (—CONH$_2$ at 169 ppm). Standard titration of the polymer with methanolic KOH indicated a high conversion of the carboxylic acid groups to carbamoyl groups (81%).

ILLUSTRATIVE EMBODIMENT II

A selectively hydrogenated triblock copolymer of the SEBS type was produced by conventional procedures having molecular weight dimensions of 7,500–35,000–7,500. This polymer was then carboxylated by conventional lithiation-carboxylation techniques to introduce 0.9% by weight of carboxylic acid groups contained in the aromatic portions of the elastomeric molecule. In a 4-liter reactor, 6000 grams of a 5% by weight solution of this elastomer was prepared in a 50:50 cyclohexane:tetrahydrofuran solvent. The solution was warmed to 34° C. and degassed. Ammonia (180 grams) was then added to the polymer solution, bringing the pressure of the reactor to 95 psig. At the conclusion of ammonia addition, heat was applied to the reactor until the contents reached 205° C. The reaction liquid was held at 205° C. for 23 hours, after which time the solution was cooled to room temperature, and the excess ammonia was removed from the reactor through venting. The resulting polymer was then coagulated from isopropanol, washed with water, and dried in a Union Hot Air Dryer at 170° F. for 2 hours. The infrared spectrum of the product was consistent with the formation of carbamoyl groups (C=O strech at 1670 cm$^{-1}$). Standard titration of the polymer with methanolic KOH indicated a high conversion of the carboxylic acid groups to carbamoyl groups (83%).

Physical and mechanical properities of the amidated product of Illustrative Example II are compared with those of the corresponding conventional KRATON ® Precursors in Table 1 and Table 2.

TABLE 1

Glass Transition Temperature of the Polystyrene Phase of KRATON ® Rubber and the Amidated Derivative

|  | Tg PS Phase (°C.) |
|---|---|
| KRATON ® Precursor | 100 |
| Amidated Polymer | 125 |

TABLE 2

Tensile Set Properties of KRATON ® Rubber and the Amidated Derivative for Stress at Break (psi)

| Temp (°C.) | KRATON ® Rubber | Amidated Polymer |
|---|---|---|
| 25 | 5600 | 5700 |
| 70 | 220 | 805 |
| 100 | 50 | 160 |

ILLUSTRATIVE EMBODIMENT III

In Illustrative Embodiment III various products were made, prepared according to the procedure of Illustrative Embodiment II. Details of the synthesis and the conversion to carbamoyl groups is shown in Table 3.

TABLE 3

| Run | CH:THF | % S | gA | t (h) | T (°C.) | P (psi) | % Ad |
|---|---|---|---|---|---|---|---|
| Precursor: SEBS (0.9% carboxyl groups) | | | | | | | |
| 1 | 50:50 | 5 | 220 | 22 | 205 | 740 | 80 |
| 2 | 60:40 | 5 | 180 | 45 | 206 | 630 | 83 |
| 3 | 75:25 | 7 | 210 | 23 | 210 | 610 | 80 |
| 4 | 0:100 | 7 | 210 | 52 | 210 | 630 | 77 |
| 5 | 22:78 | 6 | 250 | 72 | 210 | 775 | 81 |
| 6 | 50:50 |  |  |  | 180 |  | 41 |
| Precursor: SEP (0.8%) | | | | | | | |
| 1 | 50:50 | 7 | 200 | 49 | 210 | 697 | 83 |
| 2 | 50:50 | 7 | 100 | 48 | 209 | 541 | 67 |
| 3 | 50:50 | 8 | 100 | 47 | 209 | 1000 | 60 |
| Precursor: SEP (1.4%) | | | | | | | |
| 4 | 50:50 | 10 | 210 | 48 | 210 | 559 | 75 |
| 5 | 50:50 | 10 | 210 | 46 | 211 | 762 | 81 |
| Precursor: SEP (2.2%) | | | | | | | |
| 6 | 50:50 | 10 | 210 | 45 | 210 | 736 | 81 |
| 7 | 50:50 | 10 | 210 | 46 | 211 | 911 | 86 |

% S = % solids concentration.
gA = grams of ammonia added to reactor.
p = pressure exerted by solvent and ammonia during reaction.
% Ad = % of acid groups converted to amide groups.

What is claimed is:

1. In the process of producing a functionalized derivative of an elastomeric block polymer having at least one block of at least predominantly polymerized alkenyl aromatic compound and at least one block of an at least predominantly polymerized conjugated alkadiene, selectively hydrogenated in the aliphatic portion thereof, by the sequential steps of metallation, carboxylation and acidification, wherein the block copolymer has a peak molecular weight as determined by GPC or light scattering of about 11,000 to about 2,500,000, wherein the alkenyl aromatic block content is no more than about 55 wt %, and wherein no more than 25% of the unsaturation in the alkenyl aromatic block and at least 80% of the aliphatic unsaturation in the block copolymer is hydrogenated; the improvement of contacting the resulting carboxylic acid-functionalized, selectively hydrogenated block polymer thereby produced with ammonia and heating the resulting product to a temperature of at least about 180° C.

2. The process of claim 1 wherein the carboxylic acid-functionalized polymer is contacted with anhydrous ammonia in liquid phase solution at a temperature from about 10° C. to about 60° C. and a pressure up to about 150 psig.

3. The process of claim 2 wherein the heating of the product resulting from contact of the carboxylic acid-functionalized polymer and ammonia is conducted at a temperature of at least about 200° C.

4. The process of claim 2 wherein the carboxylic. acid-functionalized polymer is contacted with ammonia in a polar reaction diluent.

5. In the process of producing a functionalized derivative of an elastomeric block polymer having at least one block of at least predominantly polymerized styrene and at least one block of at least predominantly polymerized butadiene or isoprene, selectively hydrogenated in the aliphatic portion thereof, by the sequential steps of metallation, carboxylation and acidification, wherein the block copolymer has a peak molecular weight as determined by GPC or light scattering of about 11,000 to about 2,500,000, wherein the alkenyl aromatic block content is no more than about 55 wt %, and wherein no more than 25% of the unsaturation in the alkenyl aromatic block and at least 80% of the aliphatic unsaturation in the block copolymer is hydrogenated; the improvement of contacting the resulting carboxylic acid-functionalized, selectively hydrogenated block polymer thereby produced with ammonia and heating the resulting product at a temperature of at least about 180° C.

6. The process of claim 5 wherein the carboxylic acid-functionalized polymer is contacted with anhydrous ammonia in liquid phase solution at a temperature from about 10° C. to about 60° C. and a pressure up to about 150 psig.

7. The process of claim 6 wherein the heating of the product resulting from contacting the carboxylic acid-functionalized polymer and ammonia is conducted at a temperature of at least about 200° C.

8. A carbamoyl-functionalized, selectively hydrogenated block polymer derived from a base block polymer of at least one block of predominantly polymerized alkenyl aromatic compound and at least one block of at least predominantly polymerized conjugated alkadiene, wherein the block copolymer has a peak molecular weight as determined by GPC or light scattering of about 11,000 to about 2,500,000, wherein the alkenyl aromatic block content is no more than about 55 wt %, and wherein no more than 25% of the unsaturation in the alkenyl aromatic and at least 80% of the aliphatic unsaturation in the block copolymer is hydrogenated; wherein the carbamoyl functionalizing groups are present as substituents on aromatic rings.

9. The carbamoyl-functionalized, selectively hydrogenated block polymer of claim 8 wherein the base polymer contains at least one block of at least predominantly polymerized styrene and at least one block of predominantly polymerized butadiene or isoprene.

10. The carbamoyl-functionalized, selectively hydrogenated block polymer of claim 9 wherein the base block polymer is an SBS block polymer.

11. The carbamoyl-functionalized, selectively hydrogenated block polymer of claim 10 wherein the selectively hydrogenated block polymer is an SEBS block polymer.

12. The carbamoyl-functionalized, selectively hydrogenated block polymer of claim 11 having from about 5 to about 15 carbamoyl moieties per molecule.

13. The carbamoyl-functionalized, selectively hydrogenated block polymer of claim 9 wherein the base block polymer is an SI block polymer.

14. The carbamoyl-functionalized, selectively hydrogenated block polymer of claim 13 wherein the selectively hydrogenated block polymer is an SEP polymer.

15. The carbamoyl-functionalized, selectively hydrogenated block polymer of claim 14 having from about 5 to about 15 carbamoyl moieties per molecule.

* * * * *